May 7, 1963  F. A. SIMPSON  3,088,672
THERMALLY CONTROLLED VALVE WITH THREE PORTS
Filed Nov. 30, 1961  2 Sheets-Sheet 1

W₁ HAS EFFECTIVE TEMP. RANGE DIFFERENT FROM AND OVER-LAPPING W₂

W₂ HAS EFFECTIVE TEMP. RANGE DIFFERENT FROM AND OVERLAPPING W₁

INVENTOR
Frederick A. Simpson
BY Wenderoth,
Lind and Ponack,
ATTORNEYS

May 7, 1963  F. A. SIMPSON  3,088,672
THERMALLY CONTROLLED VALVE WITH THREE PORTS
Filed Nov. 30, 1961  2 Sheets-Sheet 2

W3 HAS EFFECTIVE
TEMP. RANGE SAME
AS W3 OF ELEMENT 15

INVENTOR
Fredrick A. Simpson
BY Wenderoth,
Lind and Ponack
ATTORNEYS

3,088,672
THERMALLY CONTROLLED VALVE WITH
THREE PORTS
Frederick Arnold Simpson, "Poynings," Penn Road,
Beaconsfield, Buckinghamshire, England
Filed Nov. 30, 1961, Ser. No. 156,103
Claims priority, application Great Britain Dec. 6, 1960
4 Claims. (Cl. 236—12)

The present invention relates to thermally controlled valves of the type having a cylindrical casing in which three ports are provided, at least two of which are angularly spaced around its curved periphery and are controlled by a rotor which has two arcuate port shutter members and is carried on an axially arranged spindle. In this type of valve the rotor can be rotated through a limited angle from a position in which one rotor-controlled port is obscured by one shutter member and the other is open through positions in which both the rotor-controlled ports are partially obscured to a position in which the second port is obscured by the other shutter member and the first port is fully open. The third port is always open and may be formed either in the periphery of the valve casing or in an end cover.

Valves of the present type are employed, for example, for the control of the temperature of the coolant of an engine, one of the two rotor-controlled ports being connected to a radiator inlet whilst the other is connected to a by-pass leading back to the engine, so that with rise and fall of the temperature of the coolant entering the valve from the engine, a greater or less proportion of coolant is passed through the radiator, and thus the valve exercises a regulating effect on the temperature of the coolant returned to the water jacket of the engine and thus also on the temperature of the water in the jacket.

Another application of a valve of the present invention is as a mixing valve, in which case fluids at different temperatures are fed into the valve body through the two rotor-controlled ports and the mixed fluid issues from the third port at a temperature which is dependent on the proportioning effect exercised by the rotor shutters.

In British Patent No. 845,243 there is described a thermally controlled valve of the present type in which the valve rotor is rotated by means of a thermostat element of the wax-filled type secured to a stationary rotor spindle and connected through a linkage with the rotor so that the rotor assumes an angular position dependent on the temperature to which the thermostat element is exposed.

A thermostat element of the wax-filled type includes a piston rod or plunger which is forced outwardly against the resistance of a return spring or other resilient element by the expansion of wax held in an enclosed chamber, on rise of temperature. The wax in such thermostat elements is usually mixed with finely divided metal, such as copper powder, to improve its temperature response. One example of a thermostat element of this type is shown in British Patent No. 576,779.

It is a characteristic of paraffin waxes that they have a high co-efficient of expansion in their melting point during the change of state from solid to liquid and a wax-filled thermostat element of this type produces a relatively large movement of the piston rod within a temperature range dependent on the temperature range within which the wax used melts.

This type of thermostat element is usually arranged so that the piston rod does not commence to move until a predetermined temperature is reached at the bottom end of a stated effective temperature range of the element. Above the top end of the stated temperature range the further movement of the piston rod is relatively small.

To prevent seepage of the wax past the piston a wax-filled thermostat element includes a deformable sealing member between the wax and the piston and this imposes a practical limitation on the permissible travel of the piston. The quantity of wax used in the thermostat element is also limited by reason of the low thermal conductivity of the wax and increase of the quantity of wax would have the result of delaying the response of the element to temperature changes. The force which can be applied by means of a thermostat element of this kind is limited by this factor.

According to the present invention a valve of the present type is characterised in that two wax-filled elements are connected to act in series in an operative connection between a stationary rotor spindle and the rotor.

In a preferred construction two thermostat elements are connected to the two ends of a carrier pivotally mounted on the rotor spindle, one thermostat element being linked to the rotor and the other element being linked with the stationary spindle. Preferably the barrel of the first thermostat element is clamped to the spindle and is connected by a pair of pivoted links to one end of the carrier, whilst the barrel of the second thermostat element is clamped in the other end of the carrier and is connected to the rotor by a pair of pivoted links.

This basic arrangement may be applied in two different ways so as to obtain quite separate advantages.

In one application the invention is applied to provide a valve which exercises a regulating action over a wide temperature range of, say, thirty-five degrees Fahrenheit. Commercially available wax-filled thermostat elements have a stated effective range of about fifteen to twenty degrees Fahrenheit within which their piston travel is substantially complete.

By utilising two wax-filled elements whose stated temperature ranges are different and which slightly overlap one another, rotation of the rotor may be continued through nearly double the temperature range as compared with the temperature range when only a single wax-filled element is employed.

In one example the two thermostat elements used had stated effective ranges of 155–172° F. and 170–190° F. and thus the rotor was subject to movement over a range of thirty-five degrees Fahrenheit. Preferably, however, the rotor shutters are about twice as wide as the rotor-controlled ports and the spindle may be turned, against braking resistance, at least through a limited angle by means arranged externally of the valve.

Considering the application of the valve as a mixing valve, for regulating mixed liquid temperature to a temperature in the lower part of the valve temperature range, the valve spindle may be turned to a position in which, when the thermostat elements are cold, the leading edge of one shutter is substantially at the edge of the port through which hot liquid is to be admitted, whilst the port through which cold liquid is to be admitted is blanked off by the tail end part of the other shutter, so that as soon as the temperature in the valve reaches the bottom end of the stated effective temperature range of the thermostat element having the lower stated range, the rotor shutters start to shut off the hot port and open the cold port.

When it is desired to raise the temperature of the mixture, the spindle is turned, so that the leading edge of the first shutter has to turn through an angle from the cold position before it starts to close the hot port and the second shutter has to turn through a like angle before it starts to open the cold port. At the hot limit of the valve the leading edge of the second shutter is only just clear of the edge of the cold port. In this setting of the spindle the lower range thermostat element turns the rotor completely ineffectively and it is only when a temperature approximating to the bottom of the effective range of the higher range thermostat element is reached that the rotor shutters begin respectively to close off the hot port and open the cold port. This arrangement permits the valve to be set at a selected mixture temperature lying in quite a wide range of temperatures.

In the other application of this invention the wax-filled thermostat elements have the same temperature range and by reason of the greater power available and the disposition of the elements in the linkage between the spindle and the rotor, they are employed to turn the rotor through a much larger angle, for example 60°, as compared with the case where a single wax-filled thermostat element is employed, in which case about 30° is the maximum practicable rotation of the rotor.

Since the flow through a port is governed by its cross sectional area, it follows that the wider the ports can be made, the shorter they may be made in the axial direction. It is found that the adoption of the present arrangement permits more compact valves to be made, particularly in valves having a high throughput rating, because the axial dimension may be reduced and this, of course, also leads to a significant reduction in cost.

Reference is hereinafter made to the accompanying drawings, wherein.

Figure 1:
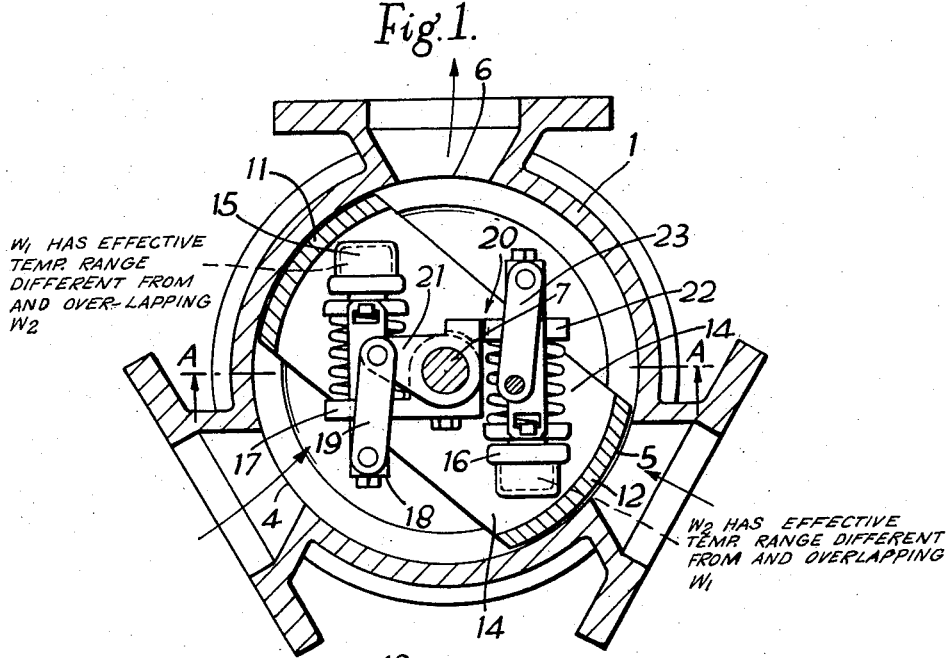
FIGURE 1 is a cross section on line B—B of FIGURE 2.
Figure 2:
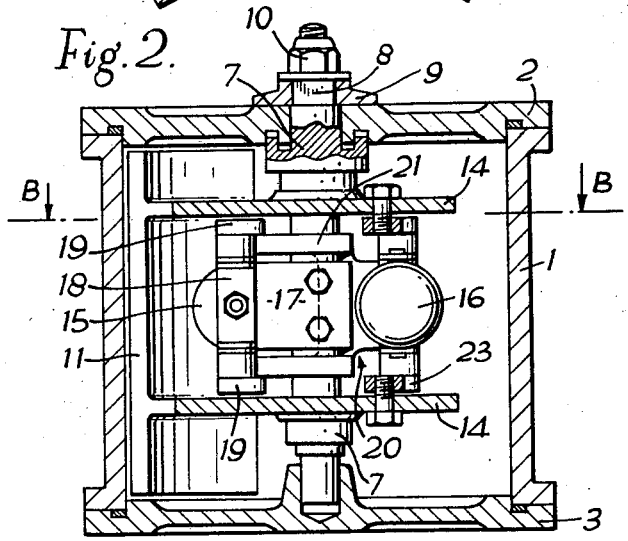
FIGURE 2 is an axial view with case sectioned on line A—A of FIGURE 1 of a mixing valve incorporating two wax-filled thermostat elements having different temperature ranges.

The valve shown in FIGURES 1 and 2 comprises a cylindrical casing 1 having top and bottom end cover plates 2 and 3 secured to it. The casing 1 is provided with two shutter-controlled ports 4 and 5 and a full bore port 6. Since in the present case the valve is a mixing valve for supplying liquid at a substantially constant temperature, ports 4 and 5 are inlet ports for hot and cold fluids respectively, whilst port 6 is an outlet port.

The valve is provided with a spindle 7, which is clamped in a fixed position during operation of the valve, but which may be angularly adjusted to raise or lower the controlled temperature of the fluid leaving the outlet port 6. For this purpose the spindle 7 is provided with a square portion 8, which is engaged by an adjustment lever 9 and an outer threaded end engaged by a clamp nut 10. The lever 9 bears an index mark which registers with a temperature scale (not shown) on the outside of top end cover plate 2.

The effective aperture of the ports 4 and 5 is controlled by arcuate shutters 11 and 12, which are connected to each other by a pair of transverse webs 14, journalled on the spindle 7, the members 11, 12 and 14 together forming the rotor of the valve.

The angular position of the rotor in relation to the spindle is controlled by two wax-filled thermostat elements 15 and 16 having wax masses $W_1$ and $W_2$ therein. The body of the element 15 is secured by a clamp 17 to the spindle 7, while the piston carries a cross head 18, which is connected by links 19 to a carrier 20, which is free to turn on the spindle 7. The links 19 are pivotally connected both to the cross head 18 and to the carrier 20. The carrier 20 comprises a pair of arms 21 which lie at opposite ends of the clamp 17 and are connected to each other by a clamp portion 22, in which the body of the element 16 is secured. The piston of the element 16 again carries a cross head by means of which it is connected through pivoted links 23 to the transverse webs 14 of the rotor.

As already stated the wax masses $W_1$ and $W_2$ in the two elements 15 and 16 have operative temperature ranges different from each other and slightly overlapping. The three ports 4, 5 and 6 each extend through about 30°, so that their edges are about 90° apart, whilst the shutters 11 and 12 extend through about 60°. Elements 15 and 16 are each arranged to turn the rotor through about 30°. In FIGURE 1 the rotor is shown in the cold position, with the spindle 7 set to control the outlet temperature to the highest value within the range of the valve. It will be appreciated that the leading edge of the shutter 11 will not reach the edge of port 4 until the lower range thermostat element (which may be either 15 or 16) is fully extended and it will not be until the same position is reached that the unmasking of the cold fluid supply port 5 will commence.

It will be appreciated that by turning spindle 7 to advance the shutter 11 in an anti-clockwise direction from the position shown in FIGURE 1, the temperature to which the mixture of fluids is controlled will be reduced because the port 4 begins to close and the port 5 begins to open at a lower temperature.

Figure 3:
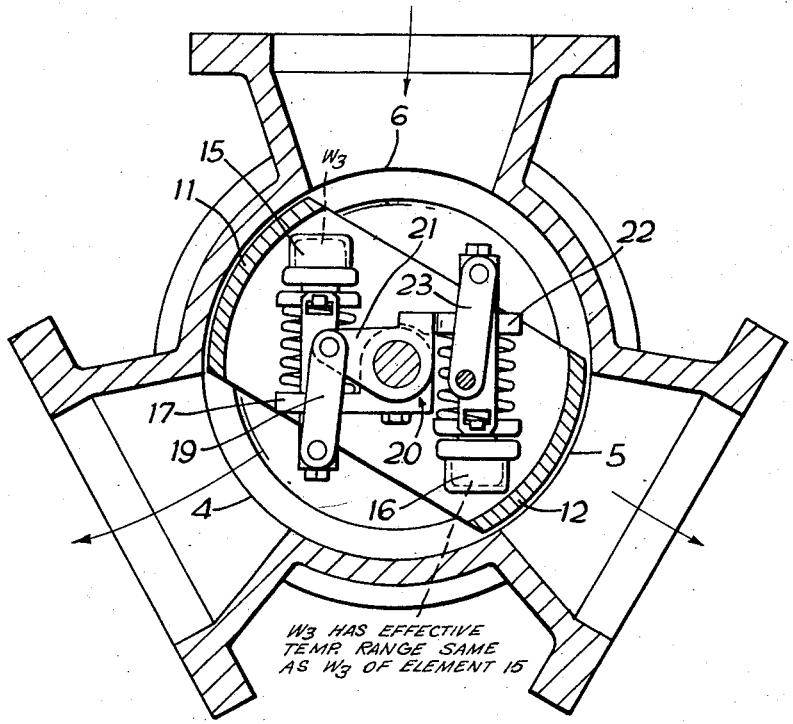
FIGURE 3 is a cross section of a diverting valve incorporating two wax-filled thermostat elements having the same temperature range.

In FIGURE 3 like reference numerals are applied to like parts. The valve shown in FIGURE 3 is a diverting valve and is intended to operate in the reverse manner to the mixing valve of FIGURES 1 and 2. Hot liquid enters through the full bore port 6 and is proportioned between the ports 4 and 5 according to its temperature. A valve operating in this manner is frequently employed for controlling the temperature of the coolant of a liquid-cooled internal combustion engine, so that when the coolant issuing from the engine jacket is below a predetermined temperature it is diverted to a by-pass line through port 4, whereas as its temperature rises an increasing proportion is admitted to a radiator through port 5.

In the construction of FIGURE 3 the operating range of the wax masses $W_3$ in elements 15 and 16 is the same and it will be seen that the angular width of the ports 4, 5 and 6 is slightly less than 60°, whilst the width of the shutters 11 and 12 is slightly in excess of 60°, so that the port 5 is wholly covered when the rotor is in the cold position, as shown in FIGURE 3. It will be appreciated that this is the position of the rotor when then engine is started up, and it is desired that there shall be maximum passage of the coolant back to the jacket through the by-pass line to ensure rapid rise of coolant temperature to a desired operating temperature.

Since both the shutter and the port are of wide angle, it is possible to make a more compact valve for a given throughput capacity as compared with a similar valve, operating with a single wax-filled thermostat element, in which case the rotation of the rotor and the port width are limited to about 30°.

I claim:

1. A thermally controlled valve comprising a casing having a cylindrical bore therein, said casing having three ports therein, at least two of said ports being at angularly spaced positions in the curved wall of said bore, a stationary spindle mounted axially of said bore, a rotor having two arcuate, diametrically opposed port-controlling shutter members and cross webs connecting said shutter members, said rotor being rotatably mounted on said spindle, said shutter members cooperating with said two ports to adjust the effective aperture thereof in accordance with the angular position of said rotor, a pair of wax filled thermostat elements controlling the angular position of said rotor, each element of said pair of wax filled thermostat elements having a body member, a plunger member guided in said body, a wax mass in said body forcing said plunger and a return spring against which the plunger is forced by thermal expansion of wax, means clamping one of said wax filled thermostat elements to said stationary axial spindle, a carrier rotatably mounted on said spindle, one of said members of the second wax filled thermostat element secured in said carrier, pivoted linkage means connecting the plunger of said first thermostat element to said carrier to turn said carried about said spindle and pivoted linkage means connecting the other member of said second thermostat element to said cross webs of said rotor.

2. A thermally controlled valve as claimed in claim 1 in which said port-controlling shutter members have an angular width approximately equal to and only slightly exceeding the angular width of the ports respectively controlled thereby, and said two wax filled thermostat elements have substantially the same effective temperature range.

3. A thermally controlled valve as claimed in claim 1, wherein the angular position of said stationary spindle in said casing is adjustable.

4. A thermally controlled valve comprising a casing having a cylindrical bore therein, said casing having three port apertures arranged at angularly spaced positions in the curved wall of said bore, a stationary spindle axially mounted in said bore, means coupled to said spindle for adjusting the angular position of said stationary spindle, a rotor rotatably mounted on said spindle, said rotor having a pair of arcuate port-controlling shutter members and at least one cross member connecting said shutter members for controlling the effective aperture of two of said port apertures, the angular width of said shutter members being substantially greater than the angular width of the corresponding port apertures, a pair of wax filled thermostat elements controlling the angular position of said rotor, each element of said pair of wax filled thermostat elements having a body member, a plunger member guided in said body, a wax mass in said body forcing said plunger outwardly, and a return spring against which the plunger is forced by thermal expansion of wax, the thermostat elements having different effective temperature ranges which just overlap, means clamping one member of one of said thermostat elements to said spindle, a carrier rotatably mounted on said spindle, pivoted linkage means connecting the other member of said one thermostat element to said carrier to turn said carrier about said spindle, one member of the second thermostat element being secured in said carrier, and pivoted linkage means connecting the other member of said other thermostat element to said rotor.

References Cited in the file of this patent

UNITED STATES PATENTS

| | | |
|---|---|---|
| 318,271 | Magoon | May 19, 1885 |
| 1,000,435 | Pagelsen | Aug. 15, 1911 |
| 2,115,501 | Vernet | Apr. 26, 1938 |
| 2,396,138 | Vernet | Mar. 5, 1946 |

FOREIGN PATENTS

| | | |
|---|---|---|
| 558,259 | Great Britain | Dec. 29, 1943 |
| 845,243 | Great Britain | Aug. 17, 1960 |